United States Patent [19]

Lem

[11] Patent Number: 4,750,034

[45] Date of Patent: Jun. 7, 1988

[54] APPARATUS FOR MONITORING THE REPLAY OF AUDIO/VIDEO INFORMATION CARRIERS

[75] Inventor: Paulus M. Lem, Wilnis, Netherlands

[73] Assignee: Cloeck en Moedigh Bioscoopreclame B.V., Netherlands

[21] Appl. No.: 5,882

[22] Filed: Jan. 21, 1987

[51] Int. Cl.⁴ .................. H04H 9/00; H04N 17/06
[52] U.S. Cl. .................................. 358/84; 358/335; 455/2
[58] Field of Search .................. 358/84, 335; 455/2

[56] References Cited

U.S. PATENT DOCUMENTS

| | | | |
|---|---|---|---|
| 4,547,804 | 10/1985 | Greenberg | 358/84 X |
| 4,567,511 | 1/1986 | Smith et al. | 358/84 |
| 4,593,337 | 6/1986 | Leone et al. | 358/84 X |
| 4,599,644 | 7/1986 | Fischer | 358/84 |
| 4,618,995 | 10/1986 | Kemp | 455/2 |
| 4,630,108 | 12/1986 | Gomersall | 358/84 |
| 4,658,290 | 4/1987 | McKenna et al. | 358/84 |

Primary Examiner—Keith E. George

[57] ABSTRACT

System for collecting data, relating to the showing of specific video information registered together with a core signal onto a registration carrier. The carrier is forwarded by the information supplier to one of a number of display stations comprising each at least a video display apparatus for displaying the registered video information and comprising a processor for detecting said code signal and deriving therefrom data about the starting time and the period during which said video information is displayed. This data is stored into a memory and the contents of the memory is at regular intervals read out by the information supplier using a reader station.

8 Claims, 6 Drawing Sheets

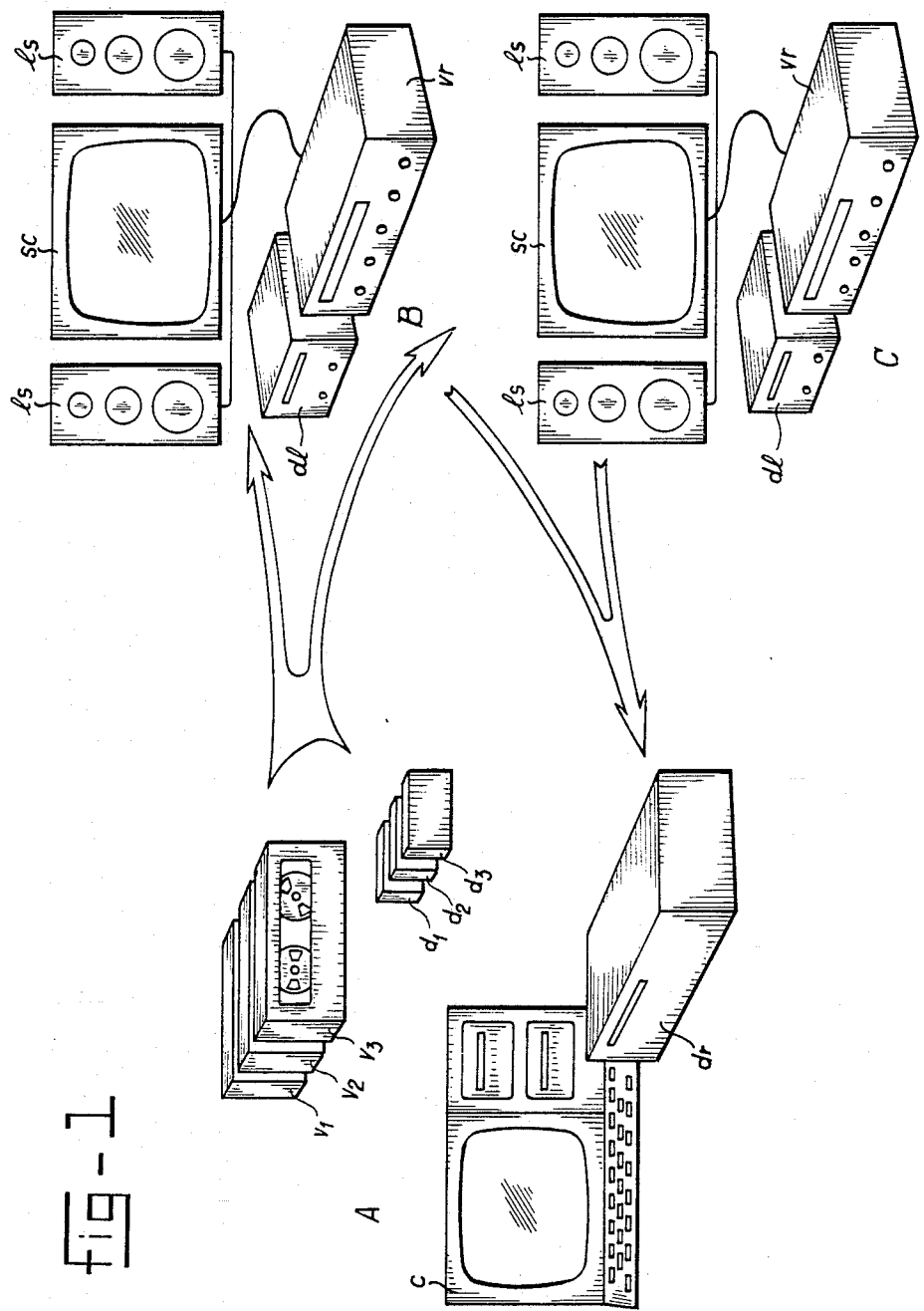

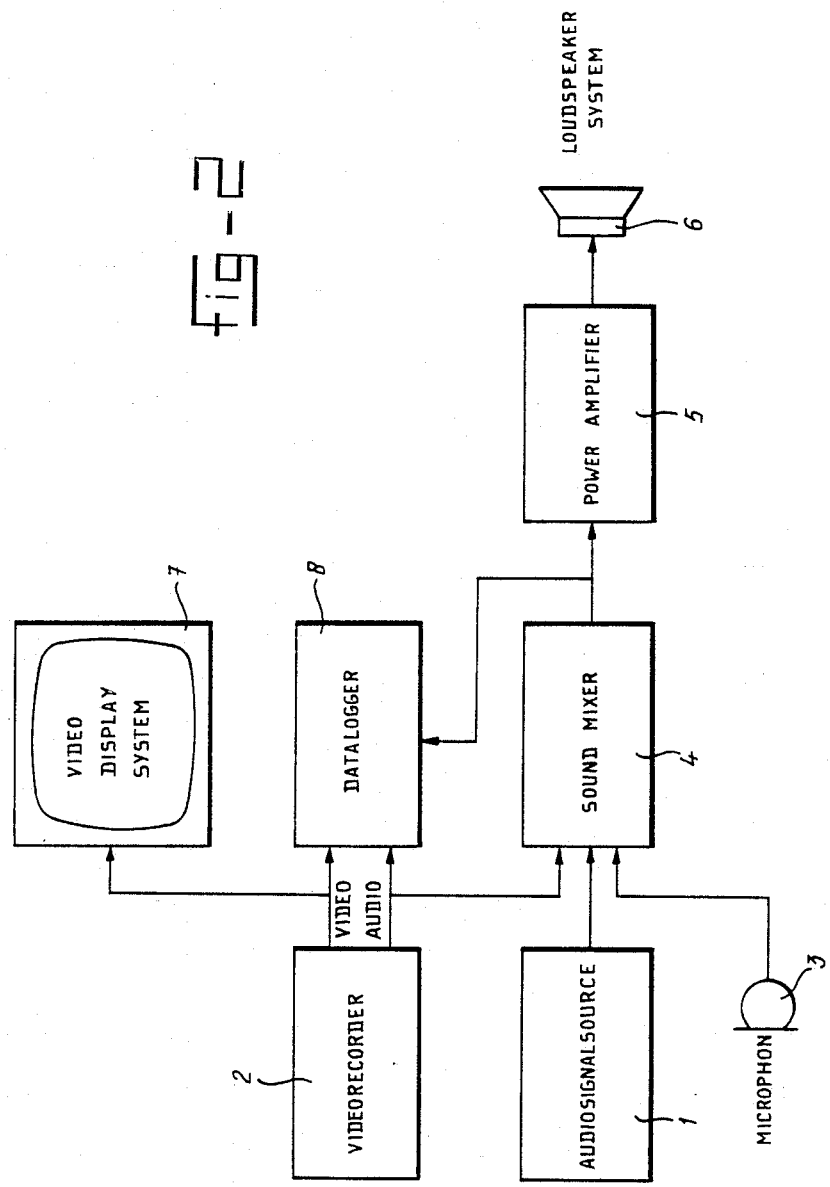

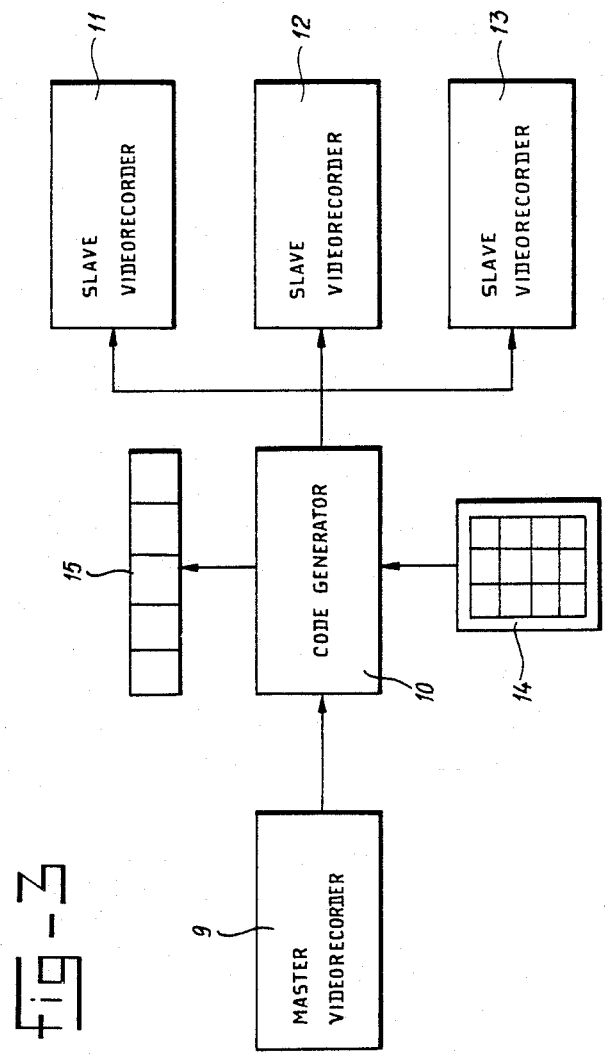

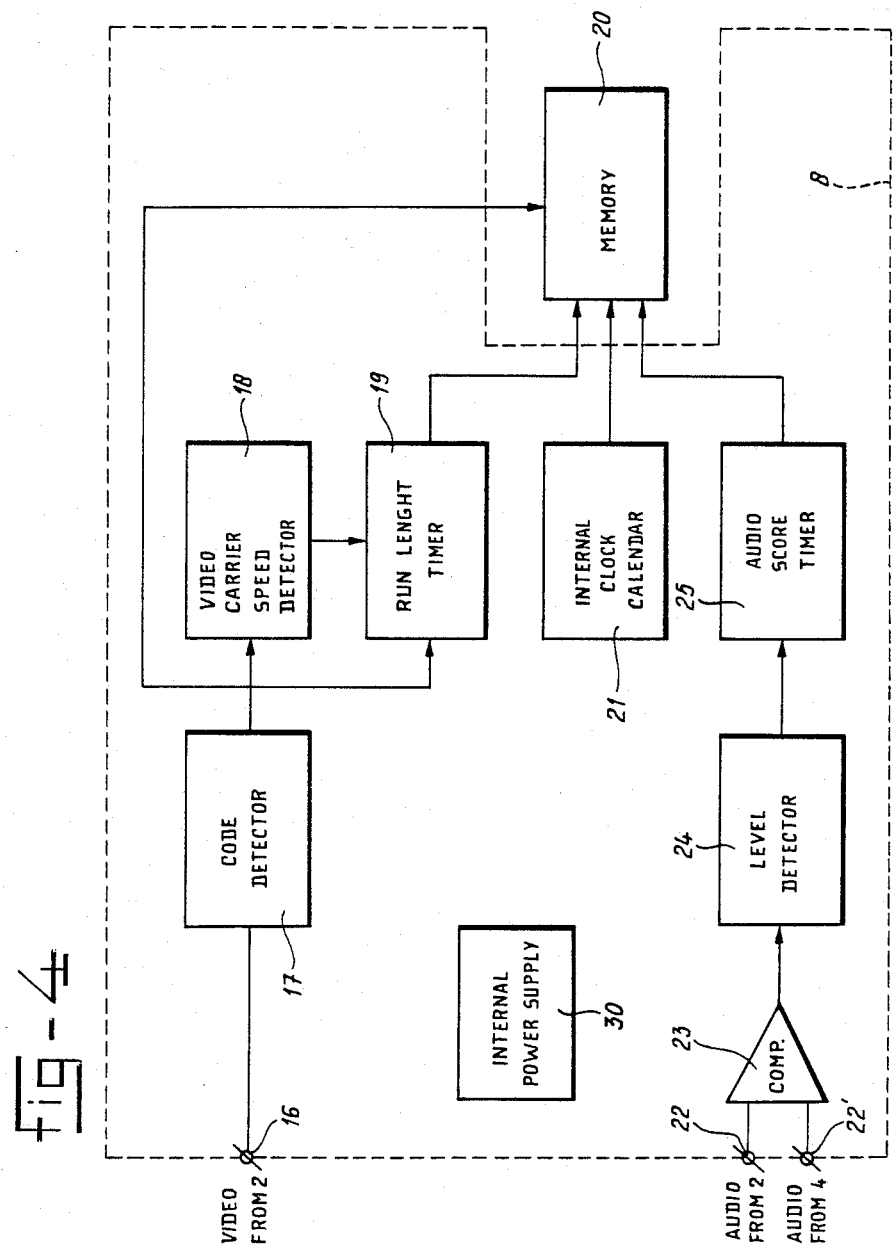

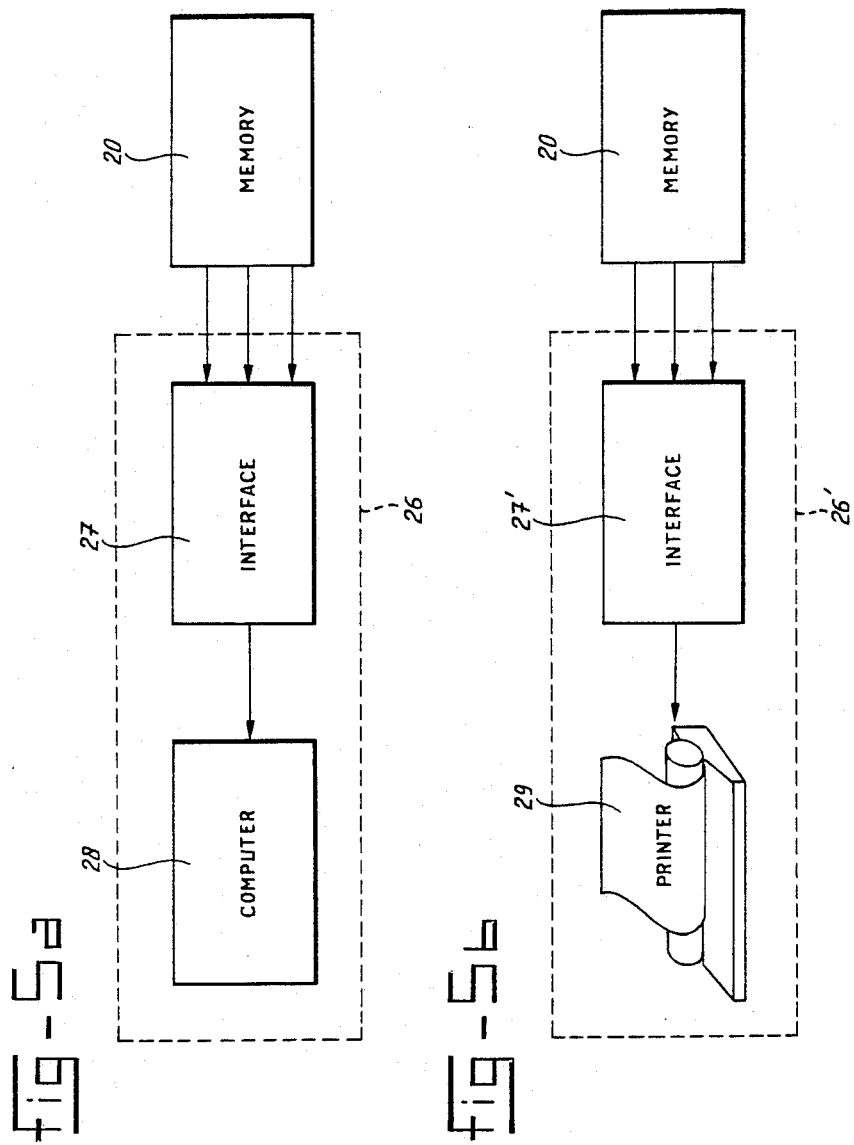

fig-6

```
SURVEY ON PERFORMANCES IN PERIOD 24 1986                                                                                    PAGE : 1
12.31.86
DISCO NR: A901  NIGHT FEVER              WINSCHOTEN               LOGGER NR: 007                      CASSETTE NR: 047
********************************************************************************************************************************
```

| date | comm. nr. | name commercial | length comm. | time of opening | time of perf. | hours open | number of perform. | perf. length | audio % | payment advice |
|---|---|---|---|---|---|---|---|---|---|---|
| 11.21.86 | D9501 | BALISTO reepjes | 30 | 21.00-03.00 uur | 23.06 | 6.00 | | 29 | 89 | Y |
| | | | | | 23.30 | | | 30 | 99 | Y |
| | | | | | 00.19 | | 3 | 29 | 99 | Y |
| 11.22.86 | D9501 | BALISTO reepjes | 30 | 20.00-04.00 uur | 18.28 | 8.00 | | 29 | 96 | Y |
| | | | | | 19.18 | | | 29 | 73 | Y |
| | | | | | 21.12 | | | 30 | 99 | Y |
| | | | | | 21.49 | | | 30 | 89 | Y |
| | | | | | 22.22 | | | 30 | 93 | Y |
| | | | | | 23.43 | | | 30 | 93 | Y |
| | | | | | 00.09 | | | 30 | 93 | Y |
| | | | | | 01.09 | | | 29 | 93 | Y |
| | | | | | 04.01 | | 9 | 29 | 99 | Y |
| 11.23.86 | D9501 | BALISTO reepjes | 30 | 14.30-18.00 en 21.00-03.00 uur | 16.34 | 9.50 | | 30 | 93 | Y |
| | | | | | 17.14 | | | 30 | 96 | Y |
| | | | | | 17.51 | | | 29 | 93 | Y |
| | | | | | 21.57 | | | 30 | 93 | Y |
| | | | | | 22.50 | | | 30 | 96 | Y |
| | | | | | 23.26 | | | 30 | 19* | *N* |
| | | | | | 01.36 | | | 30 | 96 | Y |
| | | | | | 02.32 | | 8 | 30 | 89 | Y |
| 11.28.86 | D9501 | BALISTO reepjes | 30 | 21.00-04.00 uur | 23.04 | 7.00 | | 29 | 96 | Y |
| | | | | | 00.25 | * | 2* | 30 | 99 | *N* |
| 11.29.86 | D9501 | BALISTO reepjes | 30 | 20.00-04.00 uur | 21.14 | 8.00 | | 30 | 99 | Y |
| | | | | * | 22.39 | | | 29 | 89 | Y |
| | | | | | 00.36 | | | 15* | 33 | *N* |
| | | | | | 00.38 | | | 29 | 99 | Y |
| | | | | | 01.58 | | 4 | 28 | 96 | Y |
| 11.30.86 | D9501 | BALISTO reepjes | 30 | 14.30-18.00 en 21.00-03.00 uur | 15.22 | 9.50 | | 29 | 99 | Y |
| | | | | | 15.50 | | | 29 | 89 | Y |
| | | | | | 22.07 | | | 30 | 99 | Y |
| | | | | | 23.05 | | | 30 | 89 | Y |
| | | | | | 03.14 | | 5 | 30 | 99 | Y |

APPARATUS FOR MONITORING THE REPLAY OF AUDIO/VIDEO INFORMATION CARRIERS

BACKGROUND OF THE INVENTION

The invention relates to a system for collecting data about the display of video commercials.

In the advertising industry, especially in the field of advertising through video commercials, the advertiser using a video commercial for bringing his message to the attention of the public, is anxious to get detailed answers on questions like: how many times was the video commercial displayed, was it displayed in full length, was it displayed with the corresponding sound, etc. In the past collecting data to answer all these questions in a satisfactory way was at least time consuming and unreliable.

Video commercials are displayed e.g. in hundreds of discotheques, cinemas, shopping centers, exhibitions, etc. In general, the management of the establishment (discotheque, cinema etc.) is contractually obliged to display the specific video commercial a predetermined number of times within a predetermined period. Especially when the advertiser has distributed a large number of copies of his video commercial to various establishments it is hardly possible to continuously check each of these places to find out if the management thereof fulfils its contractual obligations. It will be clear that a regular spot check only will provide very superficial data which is hardly suited for further interpretation.

Therefore there exists a need for a data collecting system providing the advertiser with reliable and accurate data suited on the one hand for checking if the management of the discotheque, cinema, etc., keeps his contractual commitments and suited on the other hand for further interpretation by the advertiser.

Furthermore there exists a need for a data collecting system with intermediate data storage facilities to eliminate the necessity, present in prior art systems, to carry out on the spot checks by specifically trained personal.

An object of the invention is therefore to provide a system for collecting reliable and accurate data concerning the showing of video commercials.

A further object of the invention is to provide a data collecting system in which the data, collected during a predetermined time period, is temporarily stored into a memory.

Another object of the invention is to provide a system for collecting data concerning each showing of a specific video commercial.

The invention now provides a system for collecting data, relating to the showing of specific video information registered together with a code signal onto a registration carrier, which carrier is forwarded by the information supplier to one of a number of display stations each comprising at least a video display apparatus for displaying the registered video information and comprising a processor for detecting said code signal and deriving therefrom data about the starting time and the period during which said video information is displayed, said data being stored into a memory, the contents of which memory is at regular intervals read out by the information supplier using a reader station.

SUMMARY OF THE INVENTION

The system according to the invention provides the advertiser or information supplier with exact data about the number of times the video commercial was shown, about the length of each showing and about the exact time of each showing. On the basis of these data the advertiser is able to decide if the management of the specific discotheque has fulfilled its contractual obligations and if therefore the advertiser is obliged to keep his end of the bargain and to pay the discotheque the agreed amount of money for the commercials shown.

Although it is certainly conceivable to design a portable reader station which is e.g. every fortnight carried from one establishment to another to collect the data stored in the memory of the system operating in each establishment, this embodiment of the system has a number of disadvantages. A portable reader station is relatively vulnerable and a slight damage of the reader station may result in loss of data which is very unfortunate. Furthermore carrying out a read-out operation in an establishment during open hours thereof will certainly meet the disapproval of management and personnel of the establishment because it may largely disturb the normal course of things.

Therefore in a preferred embodiment of the system the memory is housed into a data cassette connectable either to said processor or to said reader station, whereby the reader station is located at the information supplier's office and the data cassette in the various display stations at the various establishments are at regular intervals replaced by fresh data cassettes, the loaded data cassettes being transported to the reader station at the information supplier's office to read out and eventually process data from the various data cassettes relating to the showing of the video information in the respective display stations.

In this embodiment only the plug-in memory has to be replaced at regular intervals, eventually together with the replacement of the video commercial carrier. Such a replacement requires only a matter of seconds and does not disturb the normal course of things in an establishment. Because the actual reading operation and the eventual further processing of the read out data is carried out in the information supplier's office, the chance that data will be lost will be minimized.

According to a further preferred embodiment of the system the data collected into the memory is at regular intervals transmitted to the reader station by coupling both the memory and the reader station through a modem to a communication line (which can be a normal telephone line) and by reading the memory under the control of the reader station. In that case it is not necessary to send personnel to the establishment to pick up the memory. It is sufficient to dial the modem in the establishment and start the read operation. Preferably after checking the validity of the received data the memory is erased under the control of the reader station.

The showing of the picture information of a video commercial will in general be supported by sound information registered together with the video information onto the same carrier. It will be clear that the impact of a video commercial will be strongly detoriated if the sound is disturbed for one reason or another. If for instance in a discotheque the disc jockey is talking into the microphone during the showing of the commercial he will certainly draw the attention away from the actual commercial message. The same can happen in shopping centres, etc. if for instance the sound system is coupled to the public address system. Therefore it is preferred to use a system for collecting data, relating to the showing of specific video information registered together with a code signal onto a registration carrier, which carrier is forwarded by the information supplier to a display station comprising at least a video display apparatus for displaying the registered video information and comprising a processor for detecting said code signal and deriving therefrom data about the starting time and the period during which said video information is displayed, said data being stored into a memory, the contents of which memory is at regular intervals read out by the information supplier using a reader station, said processor furthermore comprising an analogue comparator receiving an audio signal directly from the audio output of the video display apparatus and an audio signal corresponding to the audio signal which is supplied to the speaker system, said comparator providing data about the time period in which both signals are identical.

BRIEF DESCRIPTION OF THE DRAWINGS

Further embodiments and details of the invention will be explained hereinafter with reference to the various drawings.

FIG. 1 illustrates in a very schematical way the major components incorporated within the system according to the invention.

FIG. 2 illustrates the hardware which is normally present in the establishment, extended with a data logger forming part of the system according to the invention.

FIG. 3 illustrates the hardware which is present in the information supplier's office in case the information supplier takes care of copying a master video tape into a number of copies for distribution to the various display stations, for which he is responsible.

FIG. 4 illustrates a more detailed diagram of the data logger installed in ever display station.

The FIGS. 5a and 5b illustrate alternatives for the reader station in the information supplier's office.

FIG. 6 illustrates an example of a printed data, collected with the system according to the invention.

DETAILED DESCRIPTION OF THE PREFERRED EMBODIMENTS

A very broad explanation of the general scope of the invention will now be given with reference to FIG. 1. In this Figure, very schematically, a stock of video cassettes $v_1$, $v_2$, $v_3$ and data cassettes $d_1$, $d_2$, $d_3$ in the advertising agency's office A is illustrated. From this stock one video cassette and one data cassette is at regular intervals distributed among the various display stations, such as discotheques, cinemas, exhibitions, shopping centers, etc., two of which are schematically indicated by references B and C. Each of these display stations comprises a video recorder VR, connected to a display screen SC and a loudspeaker system LS. Furthermore the video recorder is connected to a data logger DL.

After reception thereof the video cassette is inserted into the video recorder VR and the data cassette is inserted into the data logger DL. The video cassette comprises a tape on which the video commercial is registered together with a code signal. The data logger DL is connected to the video output of the video recorder VR and is continuously searching for the appearance of this code signal. After starting the video recorder VR the video commercial will be displayed onto the screen SC and simultaneously the data logger will detect the code signal and will start timing the run length of the video commercial. At the end of the video commercial the code signal disappears, the timer in the data logger DL stops and the collected data, i.e. the time of the day and the run length of the video commercial are stored into the data cassette which was beforehand inserted into the data logger DL. Every time the video commercial is shown the relevant data of this showing are in this way stored into the data cassette by the data logger DL.

At regular intervals, e.g. every two weeks, the video cassettes are exchanged and simultaneously also the data cassettes are exchanged. The used video cassettes and the now loaded data cassettes are returned to the advertising agency's office A where the data cassettes are one after the other read out by means of a data reader DR and the read out data is stored into a central memory. For further processing of the data this data reader may be connected e.g. to a central administrative computer C producing a list of the data for each of the display stations in such a way that the advertiser can see at one glance if the management of the respective establishment has fulfilled its contractual obligations with respect to the showing of the video commercial and if therefore the advertiser has to pay the contractually agreed amount of money to this management.

As an alternative, the dataloggers DL are equipped with a fixed type of memory and with a modem through which the data logger is connected to a communication line such as a normal telephone line. The reader station is also connected through a modem to the communication line and is furthermore equipped with suitable means for establishing a connection and reading the remote memories one by one.

With reference to the following FIGS. 2-5 a preferred embodiment of the hardware both in the advertising agency's office and in the various display stations will be described in more detail.

FIG. 2 illustrates in a schematical way the various components which in combination are forming the audio/video system in an average discotheque in which the system according to the invention can be applied. The system is illustrated in the FIGS. 2-5 merely as an example of the application of the invention. It will be clear that when the invention is brought into practice in e.g. a shopping center or an exhibition the actual hardware configuration of the audio/video system may differ without, however, influencing application of the invention. The system illustrated in FIG. 2 comprises a number of signal sources such as the audio signal source 1, for instance a pick up or tape recorder, the video recorder 2 and the microphone 3. The audio outputs of the audio signal source 1, the video recorder 2 and the microphone 3 are supplied to a sound mixer 4 in which the various signals are combined into one output signal which is delivered to the power amplifier 5 boosting this signal up to a sufficient level to feed the loudspeaker system 6. The video output of the video recorder 2 is supplied to a video display system 7, e.g. comprising large screen video projection means. The components described so far belong to the standard inventory of the average discotheque.

In agreement with the invention, the data logger 8 is added as a further component to the system. The video output signal and the audio output signal of the video recorder 2 are supplied to this data logger and furthermore the data logger receives the output signal from the sound mixer 4. The data logger continuously searches the video signal for the appearance of a specific code signal which is registered together with the video commercial signal onto the tape in the commercial cassette. As soon as a commerical is started the code signal will appear at the input of the data logger which in response thereto starts timing the run length of the video commercial. At the end of the showing the code signal disappears and the starting time, run length and eventual further data are stored into a memory connected to the data logger.

It is remarked that the average discotheque audio/video sound system will comprise in general more than one audio signal source and more than one microphone and also more than one video recorder. This has, however, no influence on the functioning of the data logger 8 within the scope of the invention.

The detailed functioning of the data logger 8 will be described in detail with reference to FIG. 4. However, first the way in which the code signal is registered onto the tape will be described.

FIG. 3 illustrates the code generator which can be used by the advertiser or the advertising agency to insert a commercial code signal into the video information. The actual video commercial is made and supplied by e.g. a film agency and has to be duplicated for distribution to all the various establishments (discotheques, cinemas etc.), in which the video commercial will be shown. In the central office of the advertising agency a system can be installed comprising the master video recorder 9, a code generator 10 and a number of slave video recorders, three of which with reference numbers 11, 12 and 13 are shown in FIG. 3. The code generator is controlled by means of a keyboard 14 and has furthermore an output to an alphanumeric display 15. After loading the master video tape in the master videl recorder 9 and loading the slave video recorders 11, 12 and 13 with blank duplicate tapes all the recorders are activated simultaneously.

The video signal is transmitted to the code generator wherein a commercial code is inserted into the lines of the video frame which are not visible during the display of the video commercial. Preferably the complete code signal consists of a number of sections:

a commercial code number
a distributer number
control signals.

The control signals may consist of a start bit, stop bit and time signal. This time signal switches on and off with a predetermined frequency and is used to measure the tape speed. By detecting the frequency of this time signal the data logger is able to distinguish between normal display, pause and fast forward or backward. In a practical embodiment the predetermined frequency was 16 Hz.

The code is continuously registered on the tape in every frame of the commercial from the beginning of the commercial to the end thereof. As will be explained in more detail hereinafter the whole commercial must be played at normal speed without any stops in order to get a good logging of the commercial. A stop will cause the logger to end the logging and to administer the date, time, length, commercial number and audio score of the part of the commercial that was shown. So if the video jockey makes any mistake, the registered data will show it.

In stead of dubbing the code signal in during the copying of the videotape to a number of further tapes it is of course possible to first insert the code signal and thereafter (eventually somewhere else) make the necessary copies.

FIG. 4 provides more details of the data logger 8, which is usuall installed near by the audio and video apparatus in the establishment as is illustrated in FIG. 1 and 2. The data logger 8 receives the video signal from the video recorder 2 (FIG. 2) through the input 16 and supplies this video signal to a code detector 17. As soon as the code detector 17 detects the code signal of the video commercial, a signal is transmitted from the output of the code detector 17 to the video carrier speed detector 18 and to the run length timer 19 to activate both circuits. As already explained above the code signal comprises a number of control signals one of which is a time signal switching on and off with a frequency of 16 Hz. This time signal is used in the video carrier speed detector 18 to detect whether the recorder is running at the correct tape speed. By measuring the frequency of the time signal and comparing the measured frequency with a reference value the data logger is able to distinguish between normal play, pasuse and fast forward or fast backward operation.

As long as the code detector receives code signals at regular intervals corresponding to the length of one half frame in the video signal (20 ms in European standard, 16.66 ms in U.S. standard) and as long as the video carrier speed detector 18 provides an output signal indicating the correct carrier speed the run length timer 19 is maintained activated. However, if no code is detected for a predetermined time period or the carrier speed is not correct, the run length timer is stopped. To take into account eventual dropouts in the video signal the code detector may send a stop signal to the run length timer 19 after a predetermined delay period (e.g. after 45 milliseconds). The run length timer can be embodied as a simple counter counting the number of code signals received from the code detector 17. This number of codes multiplied by the time period of one half frame (20 ms or 16.66 ms) provides the exact run length time.

At the end of the video commercial the code detector 17 transmits a stop signal or another signal derived therefrom, from the output of the code detector to the memory 20 which is coupled to the data logger 8 but does not form an integrated part thereof as is explained in detail afterwards. The memory 20 is activated by means of this signal with the result that the run length, measured by the timer 19 is stored in this memory together with the instantaneous time and date provided by the internal clock/calendar circuit 21.

If during the display of the video commercial the video carrier speed detector 18 detects a speed which is not within certain tolerance limits equal to the normal speed for displaying the video commercial, this video carrier speed detector 18 transmits a stop signal to the run length timer 19. The result thereof is that if the code detector 17 forwards the activation signal to the memory 20 a run length value will be stored in said memory which does not correspond to the actual duration of the video commercial.

As already indicated with reference to FIG. 2 preferably also the audio signal registered on the video commercial carrier is checked out. For that reason the audio signal from the video recorder 2 is supplied through input 22 to a comparator 23 within the data logger 8. The other input of the comparator 23 is connected to terminal 22 onto which the audio signal from the output of the sound mixer 4 (FIG. 1) is received. Both signals are in the comparator 23 compared, e.g. by subtracting these signals from each other and the resulting signal is supplied to the level detector 24. If both signals on the terminals 22 and 22' are, within reasonable limits, equal to each other then the output signal of the comparator 23 has a relatively low average level causing the level detector 24 to output a specific output signal to the audio score timer 25. However, if e.g. the disc jockey (or someone else) talks during the video commercial into the microphone 3 then the output signal from the sound mixer 4 will be significantly different from the audio signal delivered by the video recorder 2 with the result that the average level at the output of the comparator 23 will be relatively high. In response thereto the level detector 24 supplies another specific signal to the audio score timer 25. The audio score timer 25 calculates in fact the ratio between both specific signals. If during the whole display of the video commercial the output of the sound mixer is within reasonable limits equal to the output of the video recorder then the audio score timer 25 will provide a value near to 100% at its output. However, if the sound signal from the video recorder is disturbed by other signals, e.g. by microphone signals received from the microphone 3, then the audio score timer will accumulate a much lower percentage, e.g. 50%. This percentage value is stored in the memory together with the signals from the run length timer 19 and the internal clock/calendar circuit 21.

Although in FIG. 4 the comparison between the audio signals on the terminals 22 and 22' is done by a relatively simple comparator and level detector it is of course possible to use a more sophisticated method. In a preferred embodiment some parameters from the audio signal are calculated e.g. the rhythm of the music, the amplitude of the signal in certain frequency bands etc. This is done both for the signal which is received from the video recorder on the terminal 22 as well as for the signal received from the sound mixer on the terminal 22. Thereafter a value for the matching of these parameters is calculated. Because sound is a statistical variable, a statistical value of the match is found. The value of a correctly played commercial ranges from 85 to 100% matching. This value is influenced by the sound itself and by the way the video jockey fades from normal sound to the sound of the commercial.

To maintain at least part of the data logger circuit in an activated condition, specifically the internal clock/calendar, the data logger 8 comprises an internal power supply 30 which is able to maintain specific parts of the data logger circuit in the activated condition, even if the external power supply to the whole audio/video system is switched off. This internal power supply 30 comprises for that purpose e.g. a rechargeable battery, which will be recharged as soon as the external power supply is switched on again.

As already said the memory 20 does not necessarily form part of the data logger but is embodied as a separate component. In a preferred embodiment this memory is housed into a so-called data cassette, and may comprise a circuit board with non volatile memory chips (RAM type chips), a bubble memory circuit, a magnetic tape or any other conceivable memory suitable for this purpose. Preferably there is no battery or other form of energy supply means inside the cassette itself. Because the cassette itself does not need any energy to maintain the data these data cannot be lost.

In a practical embodiment the data cassette has a memory capacity of 600 records and this normally will be sufficient for about four weeks. Every cassette has its own number which makes it possible to trace cassettes, whenever a weak or damaged one is detected by the reader station.

Two possible embodiments of the reader station are illustrated in the FIGS. 5a and 5b. The reader station illustrated in FIG. 5a is in general indicated by the reference number 26 and comprises in this embodiment an interface 27 and a computer 28. The computer 28 may be e.g. an administrative computer which is also used for other purposes and which is installed within the office of the advertising agency. With regular intervals of e.g. two or three weeks the memories or data cassettes 20 are collected from the various discotheques and cinemas and transported to the central office of the advertising agency. The collected memories are one after the other connected to the reader station 26 as schematically illustrated in FIG. 5a. The function of the interface 27 is to read out sequentially the various records stored in the memory 20 and to deliver these recoreds to the computer 28 for further proceeding or just for storage thereof. If the memory is completely read out then the interface provides an erase signal to the memory to clear the memory completely.

In a further embodiment the reader station 26 may be embodied such that after reading and erasing the memory 20 a test routine is carried out to check the proper functioning of all parts of the data cassette specifically the memory chips thereof.

FIG. 5b illustrates another embodiment of the reader station referenced by 26' which embodiment can be used in case there is no computer 28 available at the location where the collected data cassettes are read out. This reader station 26' comprises an amended interface 27', also destined for reading out the contents of the data cassette sequentially one record after the other and to convert the read out data into signals suitable for feeding a printer mechanism 29. This very simplified reader station 26' takes care that the contents of the memory 20 are in fact stored in the form of a hard copy suitable for later use of further processing.

FIG. 6 illustrates an example of a print-out made by a printer connected to the reader station in the advertising agencies office. The heading line indicates the date of the print-out 12.31.86, the administrative discotheque number A901, the name of the establishment (discotheque "Night Fever"), the data logger code number 007 and the data cassette number 047.

The subheading line indicates that the date is printed in the first column, the number and name of the video commercial are printed in the second respectively third column, the actual length of the commercial (in seconds) is printed in the fourth column, the opening hours of the discotheque are printed in the fifth column, the number of hours the discotheque is open is printed in the seventh column, and the columns 6, 8, 9 and 10 comprise the actual data concerning each showing of the video commercial. The column 6 provides the time of showing, column 8 provides the number of showings on the corresponding date, column 9 provides the actual run length (in seconds) and column 10 provides the audio score for each time the video commercial is shown. Finally in column 11 the computer has indicated by means of a Y or a N, corresponding to yes or no, if the discotheque has to be paid for showing the video commercial. As appears from this print-out the third showing of the video commercial at the time 23.26 on the date 11.23.1986 will not be paid for because the audio score is insufficient (19%). Also the audio score on 11.28.1986 (time 00.25) and 11.29.86 (time 00.36) was insufficient and these showings will not be rewarded. On 11.29.86 (time 00.36) above all the performance length (15 sec.) was only half the actual length of the commercial (30 sec.). The data of all other showings fulfil the minimum requirements and for these showings the discotheque get paid.

Although in the above description it is assumed that the video commercial is stored on a video tape the whole invention can be used with equal effect in case the video commercial is stored onto another type of carrier such as for instance an optically readable video disc. In that case the apparatus, necessary for duplicating the disc probably will be more expensive but the further hardware necessary at the advertising agencies office and necessary in the various establishments does not need any change.

What is claimed is:

1. A system for collecting data relating to the broadcast of specific recorder video and audio information, comprising:
   (a) a record medium on which said video and audio information is recorded along with a series of code signals, having at least one predetermined frequency;
   (b) a display station comprising video display means for displaying the recorded video information and for generating an audio signal to be broadcast through speaker means;
   (c) processing means at said display station for detecting said code signals and generating therefrom data indicating the starting time of and time period during which said video information is displayed;
   (d) memory means for storing said data at said display station;
   (e) reader station means for reading out at regular intervals the contents of said memory means;
   (f) analogue comparator means at said display station for receiving an audio signal directly from said recorded audio information and an audio signal corresponding to the audio signal broadcast through said speaker means, said comparator means generating data concerning the time period during which said two audio signals are identical.

2. System according to claim 1, in which the code signal is registered within those lines in each frame of the video signal which are not visible during the display of said video information.

3. System according to claim 1, in which the speed of the video display means is checked by continuously measuring the time period between the occurrence of two succeeding code signals.

4. System according to claim 1, in which the speed of the video display apparatus is checked by measuring the frequency of part of the code signals, which part is recorded onto the record medium with a predetermined frequency.

5. System according to claim 3 or 4, including means for storing a speed error signal into the memory when said speed measuring indicates an abnormal speed of the video display apparatus.

6. System according to claim 1, in which the memory comprises a plug-in unit.

7. System according to claim 6, in which the memory has a sufficient storage capacity to store data collected in the display station during a period of at least one week.

8. The system set forth in claim 1 further comprising timer means at said display station for measuring the ratio between the time period during which said two audio signals are identical and said time period during which said video information is displayed; and means for storing information corresponding to said ratio in said memory means.

* * * * *